US012603058B1

(12) United States Patent
Hosaka

(10) Patent No.: US 12,603,058 B1
(45) Date of Patent: Apr. 14, 2026

(54) ELECTRONIC DEVICE

(71) Applicant: Innolux Corporation, Miaoli County (TW)

(72) Inventor: Shuhei Hosaka, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 19/084,770

(22) Filed: Mar. 20, 2025

(51) Int. Cl.
*G09G 3/3266* (2016.01)

(52) U.S. Cl.
CPC ... *G09G 3/3266* (2013.01); *G09G 2300/0408* (2013.01); *G09G 2300/0426* (2013.01); *G09G 2300/0814* (2013.01); *G09G 2310/0286* (2013.01); *G09G 2310/0291* (2013.01)

(58) Field of Classification Search
None
See application file for complete search history.

(56) References Cited

U.S. PATENT DOCUMENTS 9,978,728 B2 5/2018 Lin et al.
10,084,147 B2 9/2018 Liu et al.
10,304,813 B2 5/2019 Kuo et al.
10,886,260 B2 1/2021 Kuo
11,342,319 B2 5/2022 Lin et al.
11,515,271 B2 11/2022 Hosaka
11,537,015 B2 12/2022 Kuo
11,658,262 B1 5/2023 Cheng et al.
11,658,276 B2 5/2023 Huang et al.
11,699,690 B2 7/2023 Shih et al.
2019/0041701 A1 2/2019 Chen et al.
2020/0020271 A1 1/2020 Watsuda

FOREIGN PATENT DOCUMENTS

CN 111965891 4/2021

*Primary Examiner* — Aneeta Yodichkas
(74) *Attorney, Agent, or Firm* — JCIPRNET

(57) ABSTRACT

An electronic device is provided. The electronic device includes electronic unit rows and a gate driver. The gate driver is disposed between any two adjacent rows of the electronic unit rows. The gate driver includes a first output stage and a second output stage. The first output stage includes a first logic circuit and a first amplifier. The first amplifier receives a first signal from the first logic circuit and outputs a first gate signal to a first row among the electronic unit rows according to the first signal. The second output stage includes a second logic circuit and a second amplifier. The second amplifier receives a second signal from the second logic circuit and outputs a second gate signal to a second row among the electronic unit rows according to the second signal.

20 Claims, 12 Drawing Sheets

ELECTRONIC DEVICE

BACKGROUND

Technical Field

The disclosure generally relates to an electronic device, and more particularly to a bezeless electronic device.

Description of Related Art

With the pursuit of better visual enjoyment, a bezeless electronic device becomes one of the major trends in the development. The electronic device includes a driver located in a surrounding area of the electronic device. The driver drives the electronic unit rows located in an active area. The surrounding area surrounds the active area. An area of bezels of electronic device must be decided by the surrounding region. The drive located in the surrounding area hinders the narrowing of the bezels.

SUMMARY

The disclosure provides a bezeless electronic device.

In an embodiment of the disclosure, the electronic device includes electronic unit rows and a gate driver. The gate driver is disposed between any two adjacent electronic unit rows of the electronic unit rows. The gate driver includes a first output stage and a second output stage. The first output stage includes a first logic circuit and a first amplifier. The first amplifier receives a first signal from the first logic circuit and outputs a first gate signal to a first row among the electronic unit rows according to the first signal. The second output stage includes a second logic circuit and a second amplifier. The second amplifier receives a second signal from the second logic circuit and outputs a second gate signal to a second row among the electronic unit rows according to the second signal. The first row is adjacent to the second row, and the first logic circuit and the second logic circuit are located between the first amplifier and the second amplifier.

Based on the above, the gate driver is disposed between any two adjacent electronic unit rows of the electronic unit rows. Therefore, the gate driver and the electronic unit rows are disposed in an active area. In this way, the electronic device is bezeless.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
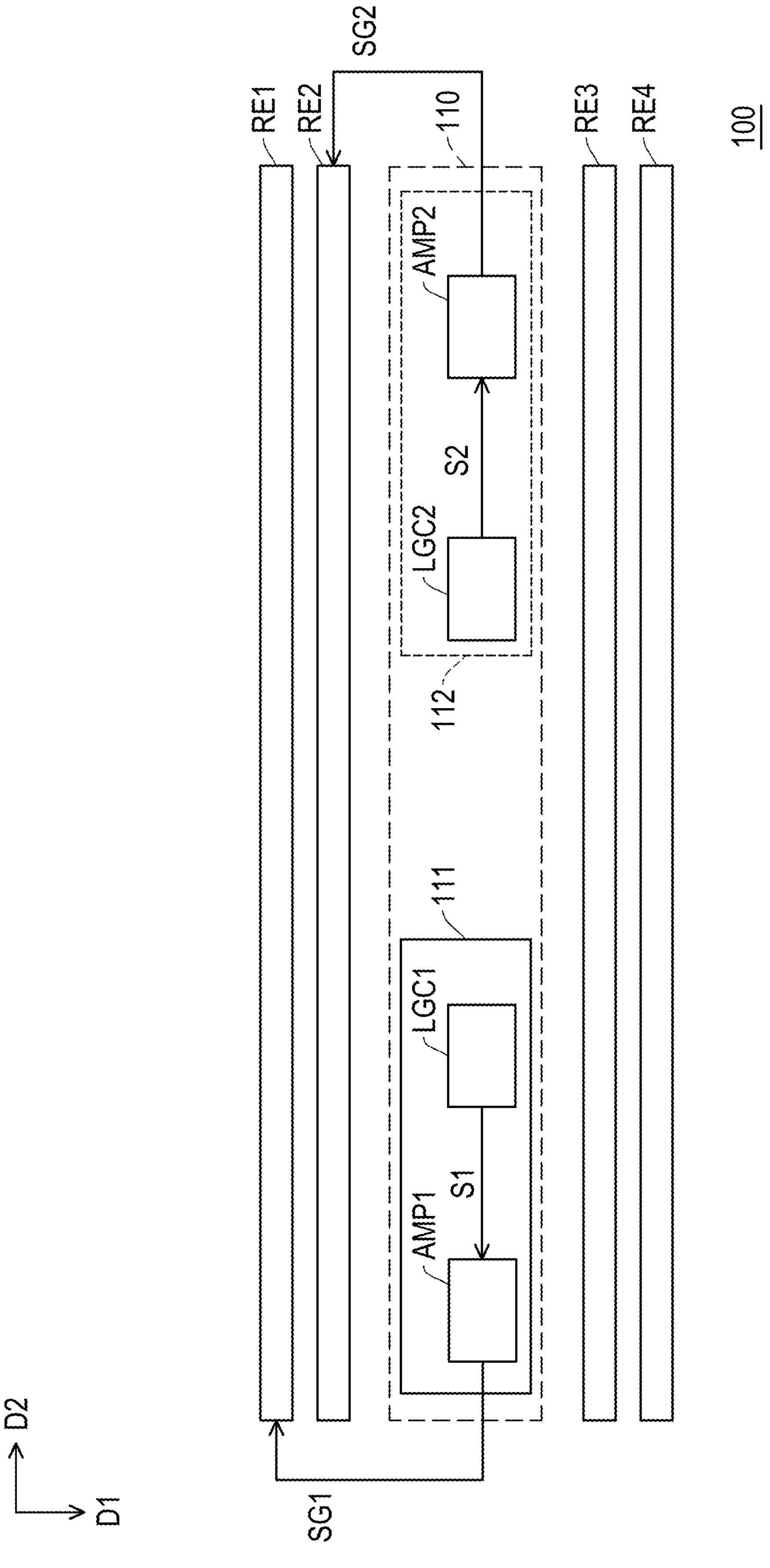
FIG. 1 illustrates a schematic diagram of an electronic device according to an embodiment of the disclosure.

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms “include”, “comprise” and “have” are used in an open-ended fashion, and thus should be interpreted to mean “include, but not limited to . . . ”. Thus, when the terms “include”, “comprise” and/or “have” are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being “coupled to”, “connected to”, or “conducted to” another element, it may be directly connected to the other element and established directly electrical connection, or intervening elements may be presented therebetween for relaying electrical connection (indirectly electrical connection). In contrast, when an element is referred to as being “directly coupled to”, “directly conducted to”, or “directly connected to” another element, there are no intervening elements presented.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

In a disclosure, the embodiments use “pixel” or “pixel unit” as a unit for describing a specific region including at least one functional circuit for at least one specific function. Describing "pixel with circuit" as "circuit" is available for a disclosure. For example, a "pixel with current source" may be described as a "current source", or a "pixel with current sink" may be described as a "current sink". The region of a "pixel" is depended on a unit for providing a specific function, adjacent pixels may share the same parts or wires, but may also include its own specific parts therein. For example, adjacent pixels may share a same scan line or a same data line, but the pixels may also have their own transistors or capacitance.

In a disclosure, a current source circuit is a circuit unit for outputting current, and a current sink is a circuit unit for draining current. The adjacent circuit units may share the same parts or wires and may also include its specific parts therein.

It should be noted that the technical features in different embodiments described in the following can be replaced, recombined, or mixed with one another to constitute another embodiment without departing from the spirit of a disclosure.

Please refer to FIG. 1, FIG. 1 illustrates a schematic diagram of an electronic device according to an embodiment of the disclosure. In the embodiment, the electronic device 100 includes electronic unit rows RE1 to RE4 and a gate driver 110. The gate driver 110 is disposed between any two adjacent electronic unit rows of the electronic unit rows RE1 to RE4. The electronic unit row RE1 is adjacent to the electronic unit row RE2. The electronic unit row RE3 is adjacent to the electronic unit row RE4.

In the embodiment, the gate driver 110 includes a first output stage 111 and a second output stage 112. The first output stage 111 includes a first logic circuit LGC1 and a first amplifier AMP1. The first amplifier AMP1 receives a first signal S1 from the first logic circuit LGC1. The first amplifier AMP1 outputs a first gate signal SG1 to the electronic unit row RE1 according to the first signal S1. Thus, the electronic unit row RE1 is scanned by the first gate signal SG1. The second output stage 112 includes a second logic circuit LGC2 and a second amplifier AMP2. The second amplifier AMP2 receives a second signal S2 from the second logic circuit LGC2. The second amplifier AMP2 outputs a second gate signal SG2 to the electronic unit row RE2 according to the second signal S2. Thus, the electronic unit row RE2 is scanned by the second gate signal SG2. The first logic circuit LGC1 and the second logic circuit LGC2 are located between the first amplifier AMP1 and the second amplifier AMP2.

For example, the first output stage 111 and the second output stage 112 are disposed between the electronic unit row RE2 and the electronic unit row RE3 along a column direction D1, but the disclosure is not limited thereto. The electronic unit rows RE1 to RE4 are arranged along the column direction D1 and extend along a row direction D2, but the disclosure is not limited thereto. The first output stage 111 and the second output stage 112 are arranged along the row direction D2, but the disclosure is not limited thereto.

It should be noted, the gate driver 110 is disposed between two adjacent electronic unit rows RE2 and RE3 of the electronic unit rows RE1 to RE4. Therefore, the gate driver 100 and the electronic unit rows RE1 to RE4 are disposed in an active area. The gate driver 110 is implemented for a gate in active area (GIA) design. In this way, the electronic device 100 is bezeless.

The first amplifier AMP1 amplifies the first signal S1 to generate the first gate signal SG1. The second amplifier AMP2 amplifies the second signal S2 to generate the second gate signal SG2.

In the embodiment, each of the electronic unit rows RE1 to RE4 includes electronic units. For example, the electronic device 100 may be a display device. Therefore, each of the electronic units is a pixel unit or sub-pixel unit. For example, the electronic device 100 may be an antenna device. Therefore, each of the electronic units is an antenna unit or an adjustable unit. In the embodiment, the electronic units may include passive components and active components, such as capacitors, resistors, inductors, diodes, transistors. Diodes may include light-emitting diodes, varactor diodes, or photodiodes. The light-emitting diode may include, for example, an organic light-emitting diode (OLED), a sub-millimeter light-emitting diode (mini-LED), a micro light-emitting diode (micro-LED), or a quantum dot light-emitting diode (quantum dot LED), but not limited thereto.

Figure 2:
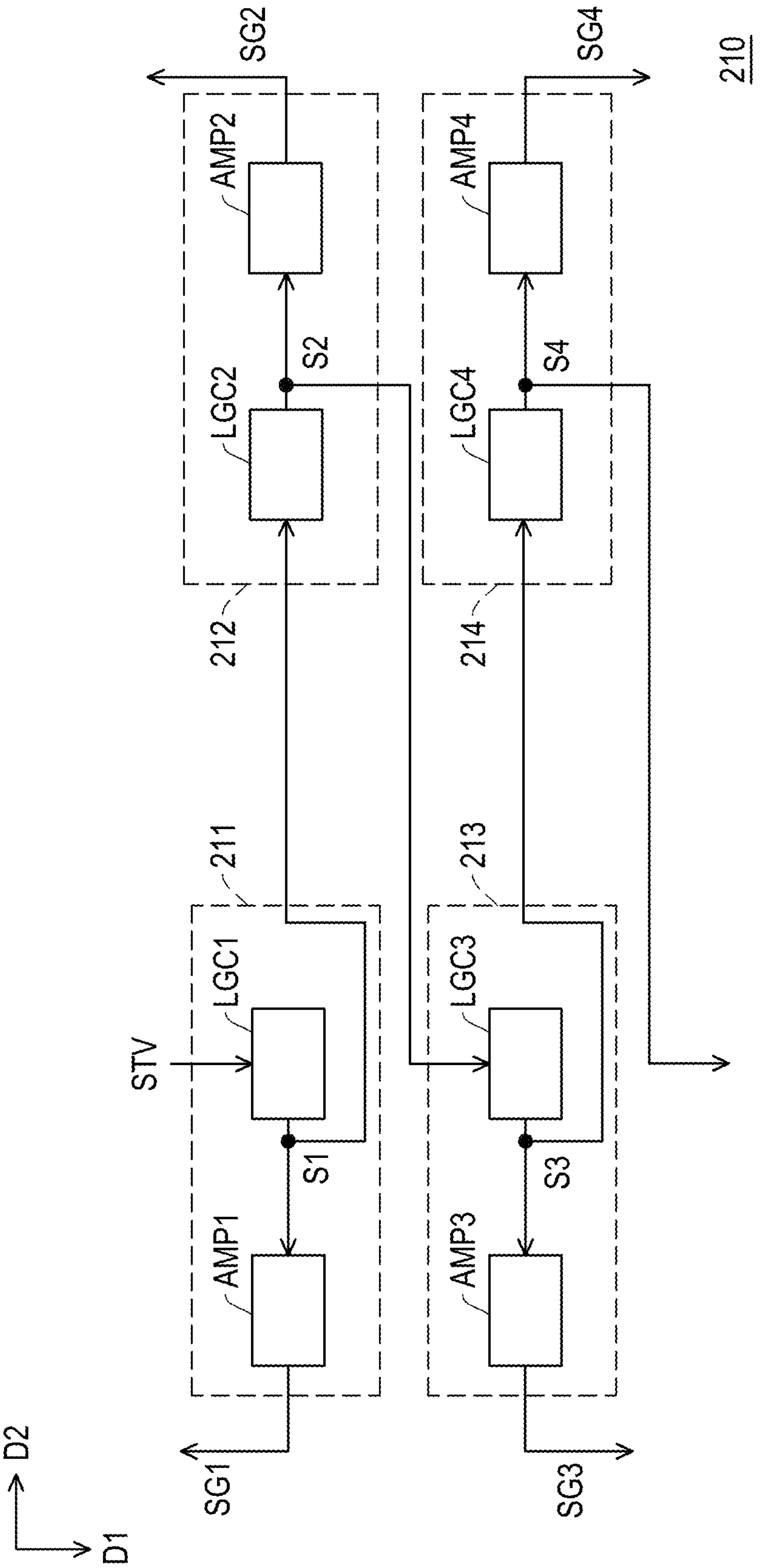
FIG. 2 illustrates a schematic diagram of a gate driver according to an embodiment of the disclosure.

Please refer to FIG. 1 and FIG. 2, FIG. 2 illustrates a schematic diagram of a gate driver according to an embodiment of the disclosure. In the embodiment, the gate driver 210 includes a first output stage 211, a second output stage 212, a third output stage 213 and a fourth output stage 214. The first output stage 211 includes the first logic circuit LGC1 and the first amplifier AMP1. The second output stage 212 includes the second logic circuit LGC2 and the second amplifier AMP2. The third output stage 213 includes the third logic circuit LGC3 and the third amplifier AMP3. The fourth output stage 214 includes the fourth logic circuit LGC4 and the fourth amplifier AMP4. The first logic circuit LGC1 and the second logic circuit LGC2 are located between the first amplifier AMP1 and the second amplifier AMP2. The third logic circuit LGC3 and the fourth logic circuit LGC4 are located between the third amplifier AMP3 and the fourth amplifier AMP4.

In the embodiment, the first logic circuit LGC1 receives a start signal STV and outputs the first signal S1 according to the start signal STV. The first amplifier AMP1 outputs the first gate signal SG1 to the electronic unit row RE1 according to the first signal S1. The second logic circuit LGC2 receives the first signal S1 and outputs the second signal S2 according to the first signal S1. The second amplifier AMP2 outputs the second gate signal SG2 to the electronic unit row RE2 according to the second signal S2. The third logic circuit LGC3 receives the second signal S2 and outputs a third signal S3 according to the second signal S2. The third amplifier AMP3 receives the third signal S3 from the third logic circuit LGC3 and outputs a third gate signal SG3 to the electronic unit row RE3 according to the third signal S3. The fourth logic circuit LGC4 receives the third signal S3 and outputs the fourth signal S4 according to the third signal S3. The fourth amplifier AMP4 receives a fourth signal S4 from the fourth logic circuit LGC4 and outputs a fourth gate signal SG4 to the electronic unit row RE4 according to the fourth signal S4. Therefore, the electronic unit rows RE1 to RE4 are scanned sequentially based on the column direction D1.

Besides, the fourth signal S4 is provided to next gate driver.

In the embodiment, the first amplifier AMP1, the first logic circuit LGC1, the second logic circuit LGC2 and the second amplifier AMP2 are arranged along the row direction D2. The third amplifier AMP3, the third logic circuit LGC3, the fourth logic circuit LGC4 and the fourth amplifier AMP4 are arranged along the row direction D2.

The first output stage 211 and the third output stage 213 are disposed between the electronic unit row RE1 and the electronic unit row RE3 along the column direction D1. The second output stage 212 and the fourth output stage 214 are disposed between the electronic unit row RE2 and the electronic unit row RE4 along the column direction D1.

Figure 3:
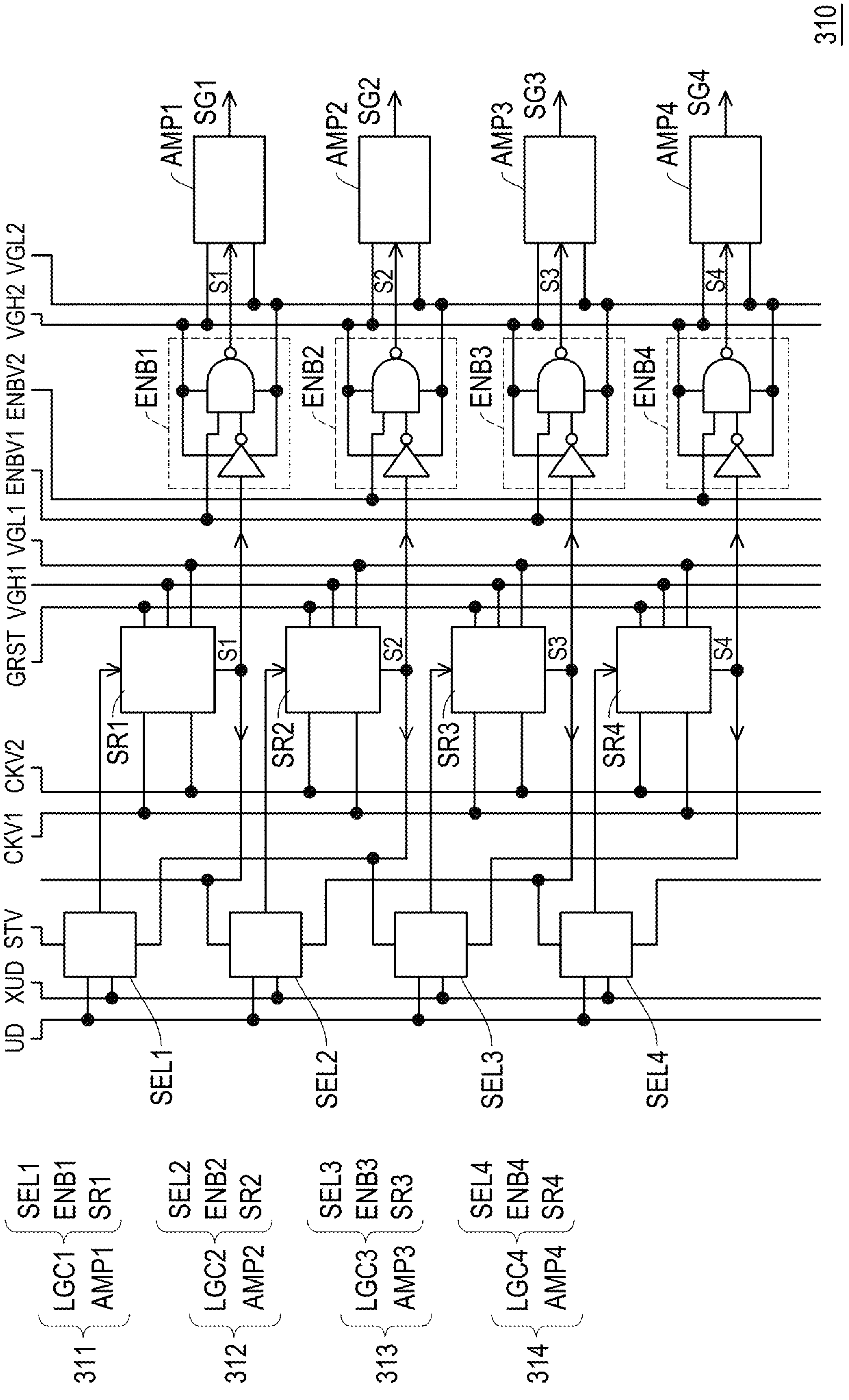
FIG. 3 illustrates a schematic diagram of a gate driver according to an embodiment of the disclosure.

Please refer to FIG. 3, FIG. 3 illustrates a schematic diagram of a gate driver according to an embodiment of the disclosure. In the embodiment, the gate driver 310 includes a first output stage 311, a second output stage 312, a third output stage 313 and a fourth output stage 314. The first output stage 311 includes the first amplifier AMP1 and the first logic circuit LGC1. The first logic circuit LGC 1 includes a first shift register SR1, a first select circuit SEL1 and a first enable circuit ENB1. The second output stage 312 includes the second amplifier AMP2 and the second logic circuit LGC2. The first logic circuit LGC 1 includes a second shift register SR2, a second select circuit SEL2 and a second enable circuit ENB2. The third output stage 313 includes the third amplifier AMP3 and the third logic circuit LGC3. The third logic circuit LGC3 includes a third shift register SR3, a third select circuit SEL3 and a third enable circuit ENB3. The fourth output stage 314 includes the fourth amplifier AMP4 and the fourth logic circuit LGC4. The fourth logic circuit LGC4 includes a fourth shift register SR4, a fourth select circuit SEL4 and a fourth enable circuit ENB4.

The first select circuit SEL1, the second select circuit SEL2, the third select circuit SEL3 and the fourth select circuit SEL4 control a scan mode of the gate driver 310 according to signals UD and XUD. For example, in a forward scan mode, the first select circuit SEL1 controls the first shift register SR1 to output the first signal S1. The first select circuit SEL1 controls the first shift register SR1 according to the start signal STV. The second select circuit SEL2 controls the second shift register SR2 to output the second signal S2 according to the first signal S1. The third select circuit SEL3 controls the third shift register SR3 to output the third signal S3 according to the second signal S2. The fourth select circuit SEL4 controls the fourth shift register SR4 to output the fourth signal S4 according to the third signal S3.

For example, the first shift register SR1, the second shift register SR2, the third shift register SR3 and the fourth shift register SR4 are driven based on clocks CKV1 and CKV2, reference voltage VGH1, VGL1 and a reset signal GRST, but the disclosure is not limited thereto.

In the embodiment, the first enable circuit ENB1 is coupled to the first shift register SR1 and the first amplifier AMP1. The first enable circuit ENB1 receives the first signal S1 and an enable signal ENBV1. The first enable circuit ENB1 outputs the first signal S1 to the first amplifier AMP1 in response to the enable signal ENBV1. The second enable circuit ENB2 is coupled to the second shift register SR2 and the second amplifier AMP2. The second enable circuit ENB2 receives the second signal S2 and an enable signal ENBV2. The second enable circuit ENB2 outputs the second signal S2 to the second amplifier AMP2 in response to the enable signal ENBV2. The third enable circuit ENB3 is coupled to the third shift register SR3 and the third amplifier AMP3. The third enable circuit ENB3 receives the third signal S3 and the enable signal ENBV1. The third enable circuit ENB3 outputs the third signal S3 to the third amplifier AMP3 in response to the enable signal ENBV1. The fourth enable circuit ENB4 is coupled to the fourth shift register SR4 and the fourth amplifier AMP4. The fourth enable circuit ENB4 receives the fourth signal S4 and the enable signal ENBV2. The fourth enable circuit ENB4 outputs the fourth signal S4 to the fourth amplifier AMP4 in response to the enable signal ENBV2.

The first amplifier AMP1 amplifies the first signal S1 to generate the first gate signal SG1. The second amplifier AMP2 amplifies the second signal S2 to generate the second gate signal SG2. The third amplifier AMP3 amplifies the third signal S3 to generate the third gate signal SG3. The fourth amplifier AMP4 amplifies the fourth signal S4 to generate the fourth gate signal SG4.

For example, each of the first enable circuit ENB1, the second enable circuit ENB2, the third enable circuit ENB3, the fourth enable circuit ENB4 may be a circuit including an inverter and a NAND gate, but the disclosure is not limited thereto.

The first enable circuit ENB1, the second enable circuit ENB2, the third enable circuit ENB3, the fourth enable circuit ENB4, the first amplifier AMP1, the second amplifier AMP2, the third amplifier AMP3 and the fourth amplifier AMP4 are driven based on the reference voltage VGH2, VGL2, but the disclosure is not limited thereto. For example, the reference voltage VGH1 and the reference voltage VGH2 are the same, but the disclosure is not limited thereto. For example, the reference voltage VGL1 and the reference voltage VGL2 are the same, but the disclosure is not limited thereto.

Figure 4:
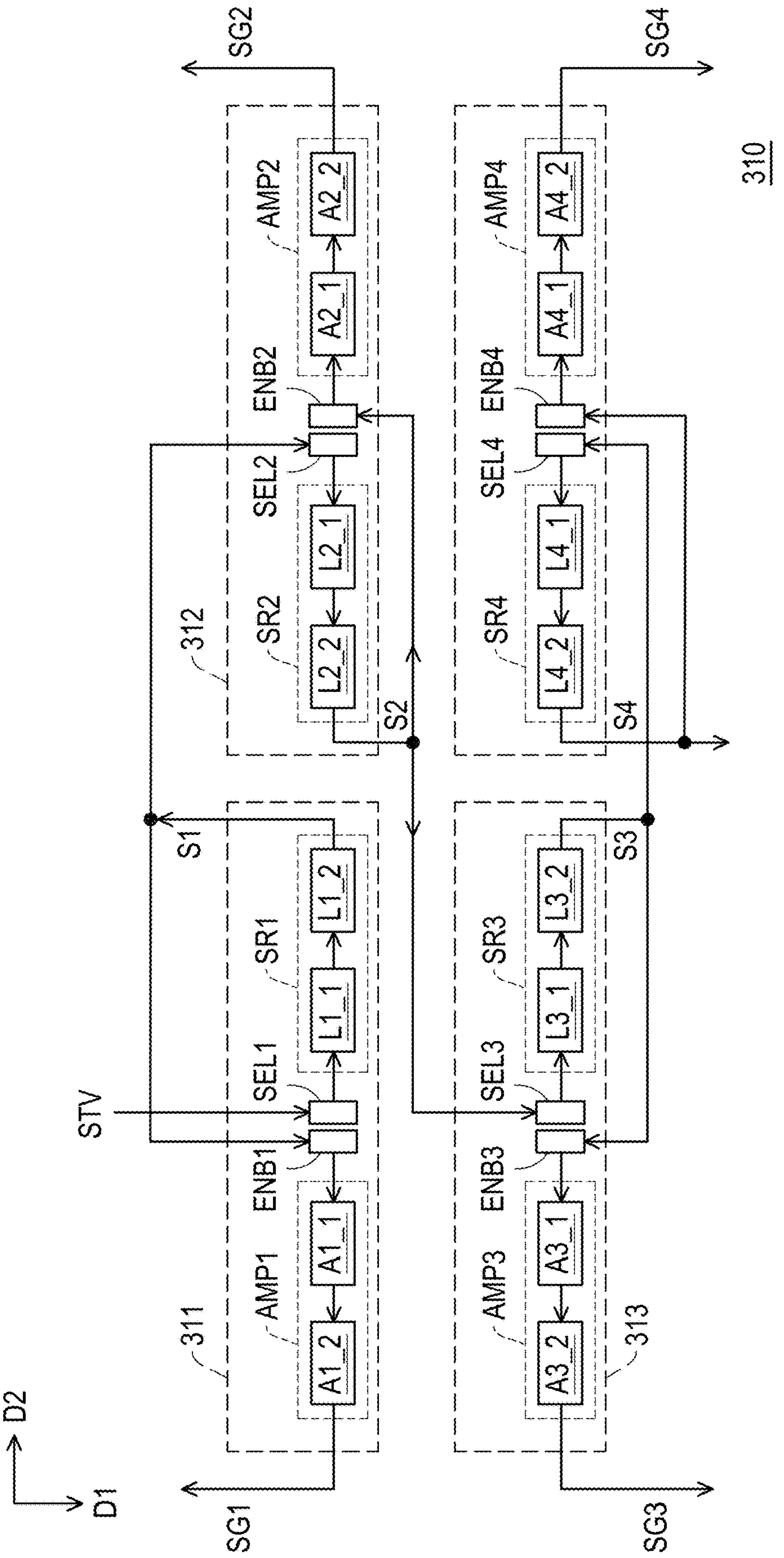
FIG. 4 illustrates a schematic diagram of a gate driver according to an embodiment of the disclosure.

Please refer to FIG. 3 and FIG. 4, FIG. 4 illustrates a schematic diagram of a gate driver according to an embodiment of the disclosure. In the embodiment, the first shift register SR1 includes circuit portions L1_1 and L1_2. In other words, the first shift register SR1 can be divided to be the circuit portions L1_1 and L1_2. The circuit portion L1_1 is first stage of the first shift register SR1. The circuit portion L1_2 is second stage of the first shift register SR1. The first amplifier AMP1 includes circuit portions A1_1 and A1_2. In other words, the first amplifier AMP1 can be divided to be the circuit portions A1_1 and A1_2. The circuit portion A1_1 is first stage of the first amplifier AMP1. The circuit portion A1_2 is second stage of the first amplifier AMP1.

Similarly, the second shift register SR2 includes circuit portions L2_1 and L2_2. The second amplifier AMP2 includes circuit portions A2_1 and A2_2. The third shift register SR3 includes circuit portions L3_1 and L3_2. The third amplifier AMP3 includes circuit portions A3_1 and A3_2. The fourth shift register SR4 includes circuit portions L4_1 and L4_2. The fourth amplifier AMP4 includes circuit portions A4_1 and A4_2.

In the embodiment, the first shift register SR1 and the second shift register SR2 are located between the first amplifier AMP1 and the second amplifier AMP2. The third shift register SR3 and the fourth shift register SR4 are located between the third amplifier AMP3 and the fourth amplifier AMP4. The first select circuit SEL1 is located between the first shift register SR1 and the first amplifier AMP1. The first enable circuit ENB1 is also located between the first shift register SR1 and the first amplifier AMP1. Detailly, the first enable circuit ENB1 is adjacent to circuit portion A1_1. The first select circuit SEL1 is adjacent to circuit portion L1_1.

The second enable circuit ENB2 and the second select circuit SEL2 are located between the second shift register SR2 and the second amplifier AMP2. Detailly, the second enable circuit ENB2 is adjacent to circuit portion A2_1. The second select circuit SEL2 is adjacent to circuit portion L2_1. The third enable circuit ENB3 and the third select circuit SEL3 are located between the third shift register SR3 and the third amplifier AMP3. Detailly, the third enable circuit ENB3 is adjacent to circuit portion A3_1. The third select circuit SEL3 is adjacent to circuit portion L3_1. The fourth enable circuit ENB4 and the fourth select circuit SEL4 are located between the fourth shift register SR4 and the fourth amplifier AMP4. Detailly, the fourth enable circuit ENB4 is adjacent to circuit portion A4_1. The fourth select circuit SEL4 is adjacent to circuit portion L4_1.

Figure 5:
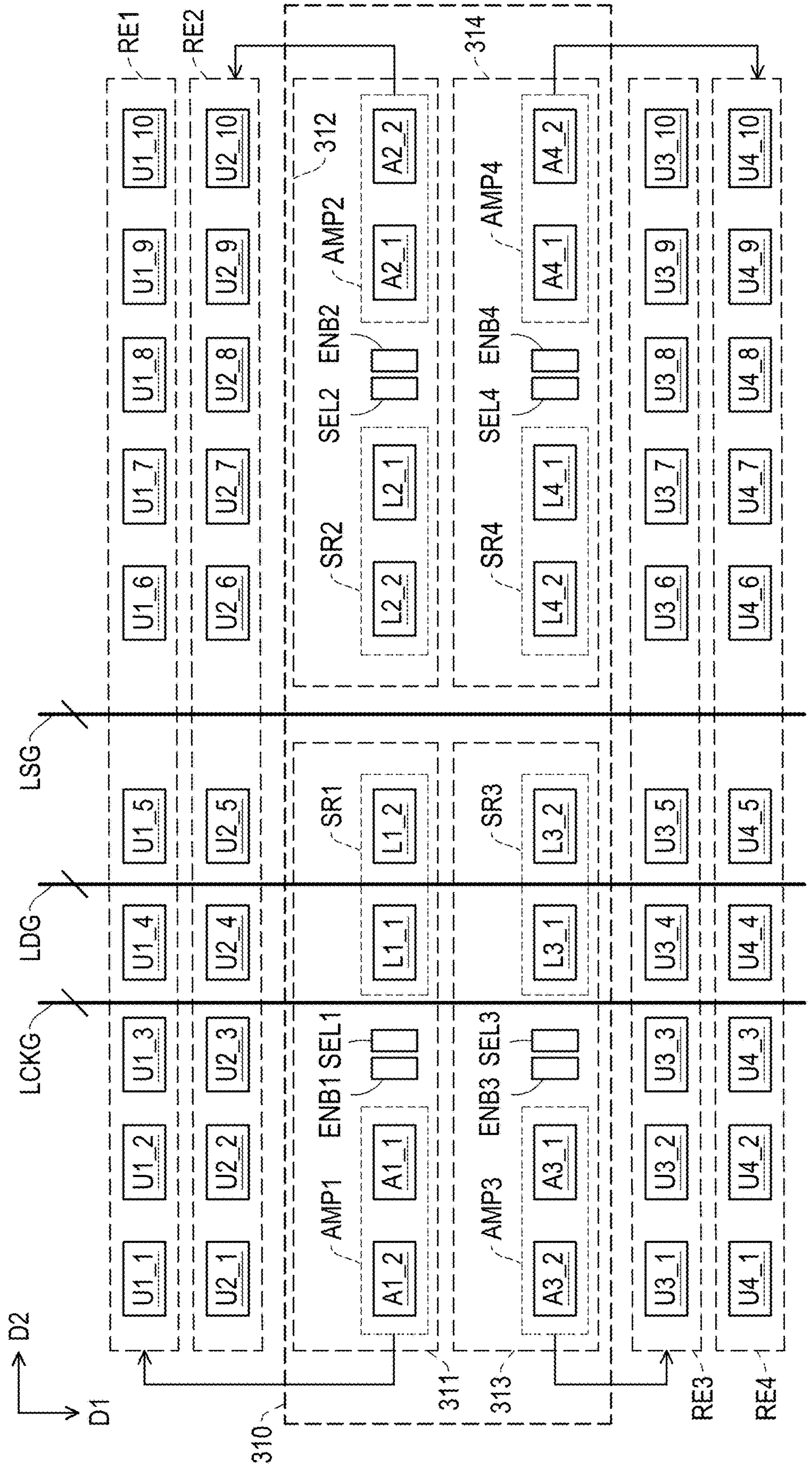
FIG. 5 illustrates a layout schematic diagram of an electronic device according to an embodiment of the disclosure.

Please refer to FIG. 3 and FIG. 5, FIG. 5 illustrates a layout schematic diagram of an electronic device according to an embodiment of the disclosure. In the embodiment, the electronic device 300 includes the electronic unit rows RE1 to RE4 and the gate driver 310. The gate driver 310 is disposed between the electronic unit row RE2 and the electronic unit row RE3 along the column direction D1.

In the embodiment, the electronic unit row RE1 includes electronic units U1_1 to U1_10. The electronic unit row RE2 includes electronic units U2_1 to U2_10. The electronic unit row RE3 includes electronic units U3_1 to U3_10. The electronic unit row RE4 includes electronic units U4_1 to U4_10.

In the embodiment, the electronic units U1_1, U2_1, U3_1, U4_1, the circuit portion A1_2 and the circuit portion A3_2 are arranged in a column C1_1. The electronic units U1_2, U2_2, U3_2, U4_2, the circuit portion A1_1 and the circuit portion A3_1 are arranged in a column C1_2 adjacent to the column C1_1. The electronic units U1_3, U2_3, U3_3, U4_3, the first select circuit SEL1, the first enable circuit ENB1, the third select circuit SEL3 and the third enable circuit ENB3 are arranged in a column C1_3. The electronic units U1_4, U2_4, U3_4, U4_4, the circuit portion L1_1 and the circuit portion L3_1 are arranged in a column C1_4. The electronic units U1_5, U2_5, U3_5, U4_5, the circuit portion L1_2 and the circuit portion L3_2 are arranged in a column C1_5 adjacent to the column C1_4. In the embodiment, the arrangements in columns C1_6 to C1_10 are similar to the arrangements in the columns C1_1 to C1_5.

Generally, a width of the first shift register SR1 is larger than any one of width of the electronic units U1_1 to U1_10. A width of the first amplifier AMP1 is also larger than any one of width of the electronic units U1_1 to U1_10. Therefore, based on the arrangements in the columns C1_1 to C1_10, the shift register SR1 is divided to be the circuit portions L1_1 and L1_2. The first amplifier AMP1 is divided to be the circuit portions A1_1 and A1_2. In the embodiment, the width is measured along the row direction D2.

In the embodiment, the electronic device 300 further includes a clock line group LCKG for transmitting at least the clocks CKV1 and CKV2 and a data line group LDG for transmitting data signals for the electronic unit rows RE1 to RE4. The clock line group LCKG includes clock lines. The data line group LDG includes data lines. The clock line group LCKG and the data line group LDG are separated by the column C1_4. Therefore, an interference between the data signals and the clocks CKV1 and CKV2 could decreased.

In the embodiment, the electronic device 300 further includes a shift pulse line group LSG for transmitting the first signal S1, the second signal S2, the third signal S3 and the fourth signal S4. The shift pulse line group LSG and the data line group LDG are separated by the column C1_5. Therefore, an interference between the data signals and the signals on the shift pulse line group LSG could decreased.

Figure 6:
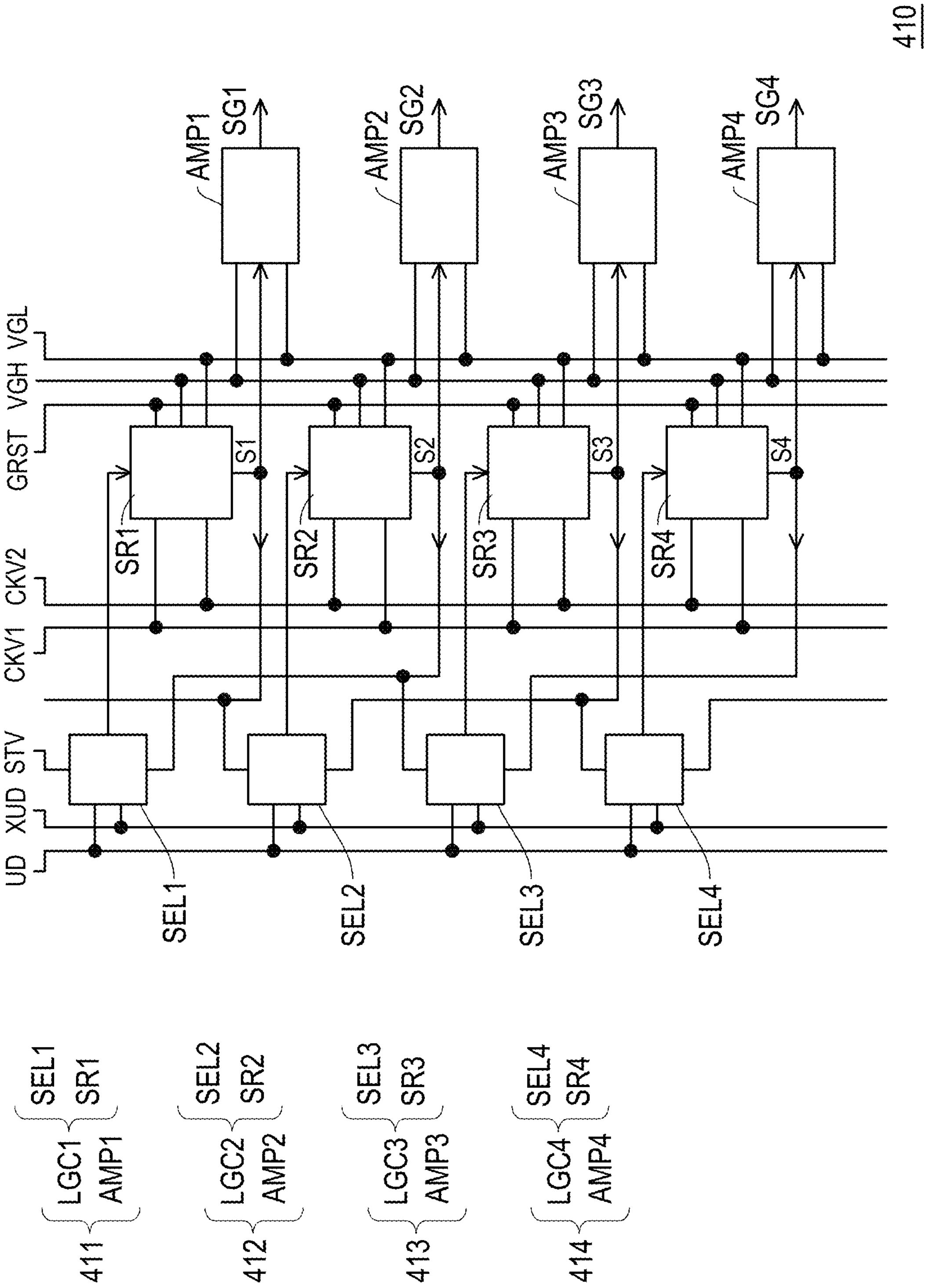
FIG. 6 illustrates a schematic diagram of a gate driver according to an embodiment of the disclosure.

Please refer to FIG. 6, FIG. 6 illustrates a schematic diagram of a gate driver according to an embodiment of the disclosure. In the embodiment, the gate driver 410 includes a first output stage 411, a second output stage 412, a third output stage 413 and a fourth output stage 414.

The first output stage 411 includes the first amplifier AMP1 and the first logic circuit LGC1. The first logic circuit LGC1 includes the first shift register SR1 and the first select circuit SELL. The second output stage 412 includes the second amplifier AMP2 and the second logic circuit LGC2. The second logic circuit LGC2 includes the second shift register SR2 and the second select circuit SEL2. The third output stage 413 includes the third amplifier AMP3 and the third logic circuit LGC3. The third logic circuit LGC3 includes the third shift register SR3 and the third select circuit SEL3. The fourth output stage 414 includes the fourth amplifier AMP4 and the fourth logic circuit LGC4. The fourth logic circuit LGC4 includes the fourth shift register SR4 and the fourth select circuit SEL4. Different from the gate driver 310 as shown in FIG. 3, the gate driver 410 does not perform operation of the first enable circuit ENB1, the second enable circuit ENB2, the third enable circuit ENB3 and the fourth enable circuit ENB4.

The operation and layout of the first amplifier AMP1, the first shift register SR1, the first select circuit SEL1, the second amplifier AMP2, the second shift register SR2, the second select circuit SEL2, the third amplifier AMP3, the third shift register SR3, the third select circuit SEL3, the fourth amplifier AMP4, the fourth shift register SR4 and the fourth select circuit SEL4 have been clearly explained in the embodiments of FIG. 3, FIG. 4 and FIG. 5, so it will not be repeated here.

Figure 7:
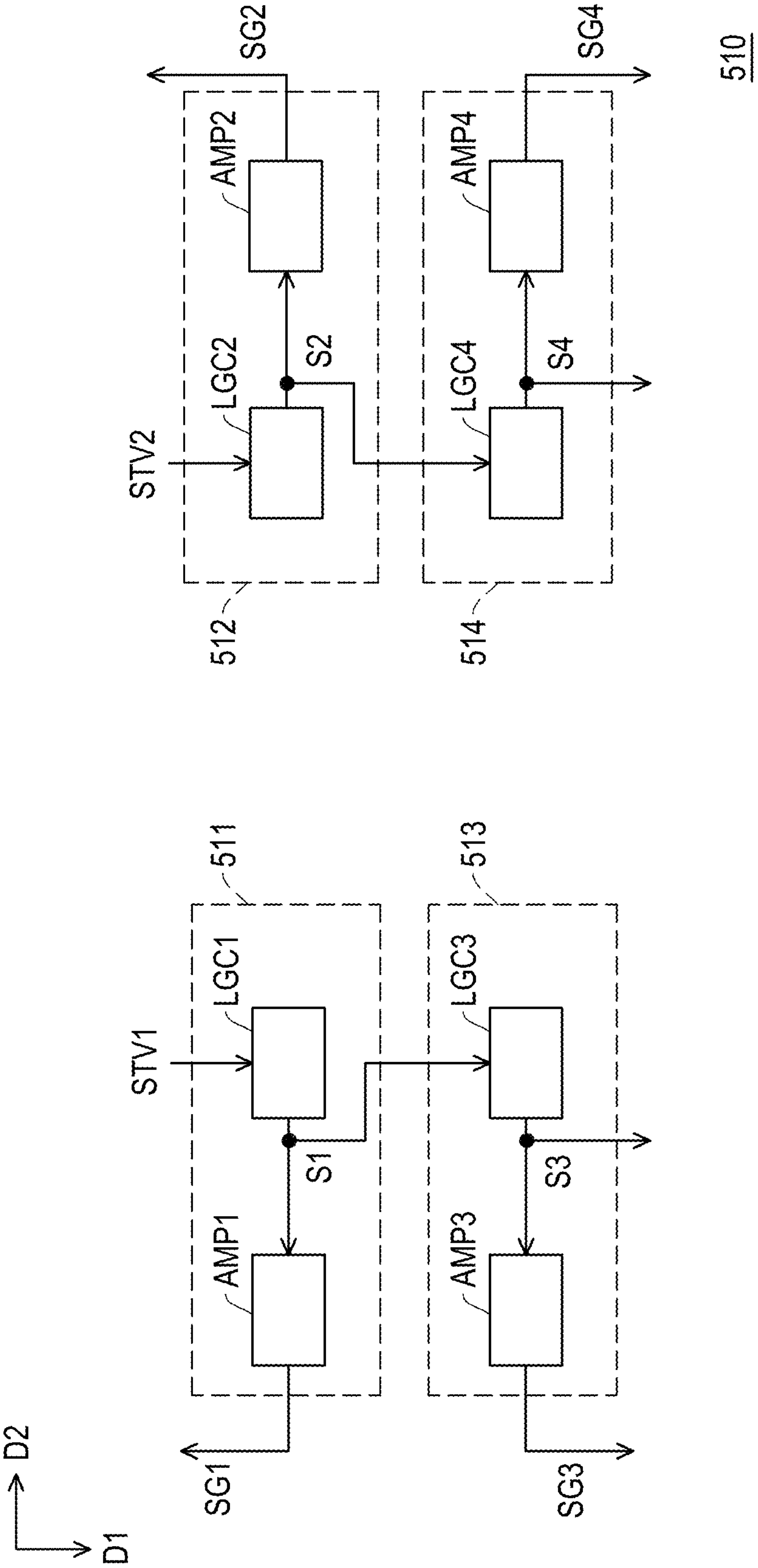
FIG. 7 illustrates a schematic diagram of a gate driver according to an embodiment of the disclosure.

Please refer to FIG. 1 and FIG. 7, FIG. 7 illustrates a schematic diagram of a gate driver according to an embodiment of the disclosure. In the embodiment, the gate driver 510 includes a first output stage 511, a second output stage 512, a third output stage 513 and a fourth output stage 514. The first output stage 511 includes the first logic circuit LGC1 and the first amplifier AMP1. The second output stage 512 includes the second logic circuit LGC2 and the second amplifier AMP2. The third output stage 513 includes the third logic circuit LGC3 and the third amplifier AMP3. The fourth output stage 514 includes the fourth logic circuit LGC4 and the fourth amplifier AMP4. The first logic circuit LGC1 and the second logic circuit LGC2 are located between the first amplifier AMP1 and the second amplifier AMP2. The third logic circuit LGC3 and the fourth logic circuit LGC4 are located between the third amplifier AMP3 and the fourth amplifier AMP4.

In the embodiment, the first logic circuit LGC1 receives a start signal STV1 and outputs the first signal S1 according to the start signal STV1. The second logic circuit LGC2 receives a start signal STV2 and outputs the second signal S2 according to the start signal STV2. The first amplifier AMP1 outputs the first gate signal SG1 to the electronic unit row RE1 according to the first signal S1. The second amplifier AMP2 outputs the second gate signal SG2 to the electronic unit row RE2 according to the second signal S2. The third logic circuit LGC3 receives the first signal S1 and outputs the third signal S3 according to the first signal S1. The third amplifier AMP3 receives the third signal S3 from the fourth logic circuit LGC3 and outputs the third gate signal SG3 to the electronic unit row RE3 according to the third signal S3. The fourth logic circuit LGC4 receives the second signal S2 and outputs the fourth signal S4 according to the second signal S2. The fourth amplifier AMP4 receives the fourth signal S4 from the fourth logic circuit LGC4 and outputs the fourth gate signal SG4 to the electronic unit row RE4 according to the fourth signal S4.

Besides, the third signal S3 and the fourth signal S4 are provided to next gate driver.

In the embodiment, a layout of the gate driver 510 could be implemented based on FIG. 5, so it will not be repeated here.

Figure 8A:
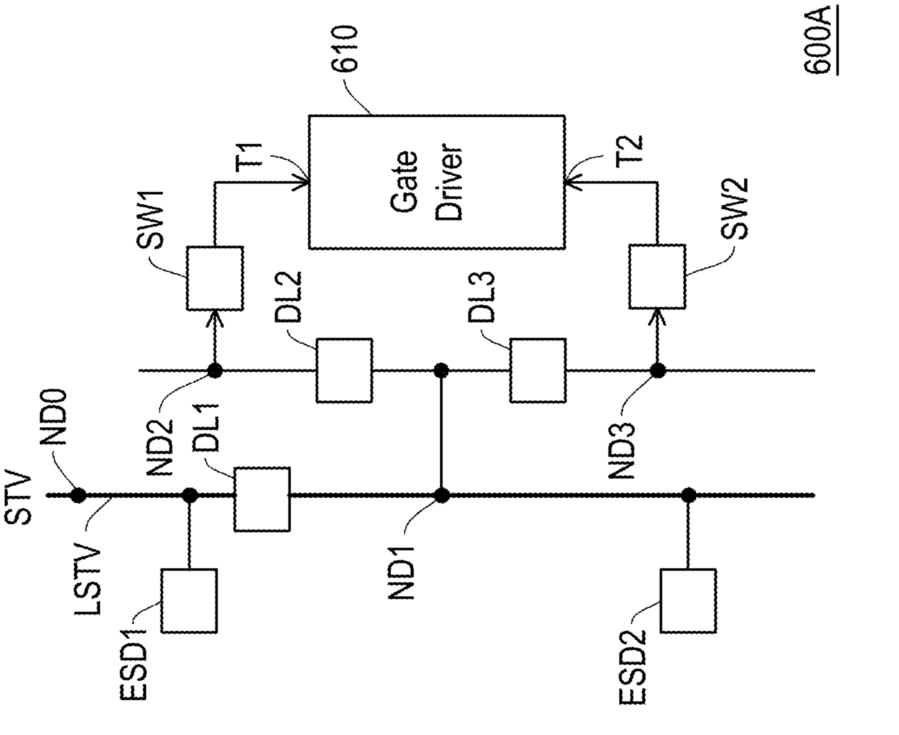
FIG. 8A illustrates a schematic diagram of an electronic device according to an embodiment of the disclosure.

Please refer to FIG. 8A, FIG. 8A illustrates a schematic diagram of an electronic device according to an embodiment of the disclosure. In the embodiment, the electronic device 600A includes a gate driver 610, a signal line LSTV, switches SW1, SW2 and delay elements DL1 to DL3. The gate driver 610 could be implemented by one of the gate driver 110 as shown in FIG. 1, the gate driver 210 as shown in FIG. 2, the gate driver 310 as shown in FIG. 3, the gate driver 410 as shown in FIG. 6 and the gate driver 510 as shown in FIG. 7.

An input terminal of the signal line LSTV receives the start signal STV on a node ND0. The delay element DL1 is connected between the input terminal of the signal line LSTV and a node ND1. The delay element DL2 is connected between the node ND1 and an input terminal (that is, a node ND2) of the switch SW1. An output terminal of the switch SW1 is connected to a terminal T1 of the gate driver 610. The delay element DL3 is connected between the node ND1 and an input terminal (that is, a node ND3) of the switch SW2. An output terminal of the switch SW2 is connected to a terminal T2 of the gate driver 610.

In the forward scan mode, the switch SW1 is turned on. The switch SW2 is turned off. Therefore, the start signal STV is transferred to the terminal T1 of the gate driver 610. In a backward scan mode, the switch SW2 is turned on. The switch SW1 is turned off. Therefore, the start signal STV is transferred to the terminal T2 of the gate driver 610.

Generally, a transmission length of the start signal STV in the backward scan mode is longer than a transmission length of the start signal STV in the forward scan mode. Therefore, the start signal STV has different delay in different scan modes. In the embodiment, the delay element DL1 delays the start signal STV based on a first time constant. Each of the delay element DL2 and the delay element DL3 provides a second time constant. Therefore, a delay of the start signal STV provided to the terminal T1 is similar to a delay of the start signal STV provided to the terminal T2. Each of the delay elements DL1 to DL3 is a passive RC circuit or adjustable RC circuit.

In the embodiment, the electronic device 600A further includes electrostatic discharge (ESD) protection circuit ESD1 and ESD2. The ESD protection circuits ESD1 and ESD2 are connected to the signal line LSTV. The ESD protection circuits ESD1 and ESD2 releases an ESD energy on the signal line LSTV.

Figure 8B:
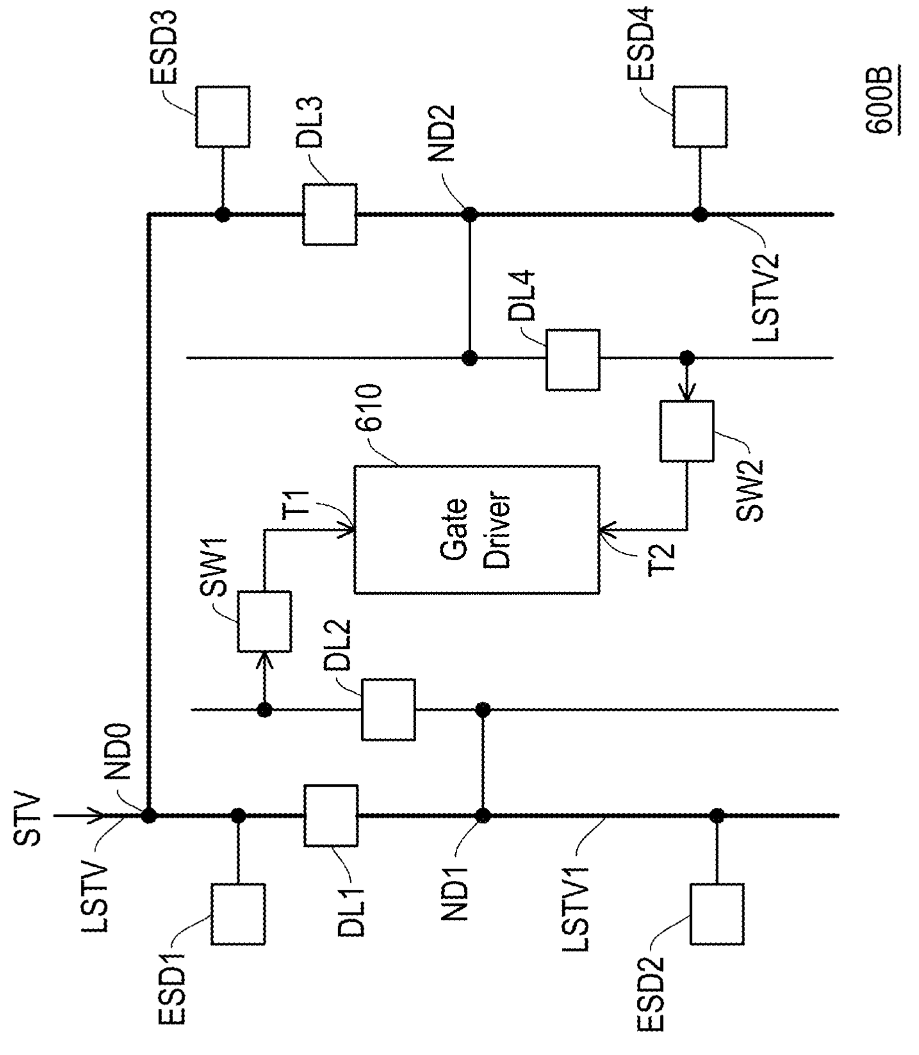
FIG. 8B illustrates a schematic diagram of an electronic device according to an embodiment of the disclosure.

Please refer to FIG. 8B, FIG. 8B illustrates a schematic diagram of an electronic device according to an embodiment of the disclosure. In the embodiment, the electronic device 600B includes a gate driver 610, the signal line LSTV, the switches SW1, SW2 and delay elements DL1 to DL4. The signal line LSTV is branched into lines LSTV1 and LSTV2 on the node ND0. The input terminal of the signal line LSTV receives the start signal STV. The delay element DL1 is connected between the node ND0 and the node ND1 on the line LSTV1. The delay element DL2 is connected between the node ND1 and the input terminal of the switch SW1. The output terminal of the switch SW1 is connected to the terminal T1 of the gate driver 610. The delay element DL3 is connected between the node ND0 and the node ND2 on the line LSTV2. The delay element DL4 is connected between the node ND2 and the input terminal of the switch SW2. An output terminal of the switch SW2 is connected to a terminal T2 of the gate driver 610.

In the forward scan mode, the switch SW1 is turned on. The switch SW2 is turned off. Therefore, the start signal STV is transferred to the terminal T1 of the gate driver 610 through the switch SW1. In the backward scan mode, the switch SW2 is turned on. The switch SW1 is turned off. Therefore, the start signal STV is transferred to the terminal T2 of the gate driver 610 through the switch SW2.

In the embodiment, the delay elements DL1 and DL2 delay the start signal STV based on a time constant. The delay elements DL3 and DL4 delay the start signal STV based on the same time constant. Therefore, the delay of the start signal STV provided to the terminal T1 is similar to the delay of the start signal STV provided to the terminal T2. Each of the delay elements DL1 to DL4 is a passive RC circuit or adjustable RC circuit.

In the embodiment, the electronic device 600B further includes ESD protection circuit ESD1 to ESD4. The ESD protection circuits ESD1 and ESD2 are connected to the line LSTV1. The ESD protection circuits ESD1 and ESD2 releases an ESD energy on the line LSTV1. The ESD protection circuits ESD3 and ESD4 are connected to the line LSTV2. The ESD protection circuits ESD3 and ESD4 releases an ESD energy on the line LSTV2.

Figure 8C:
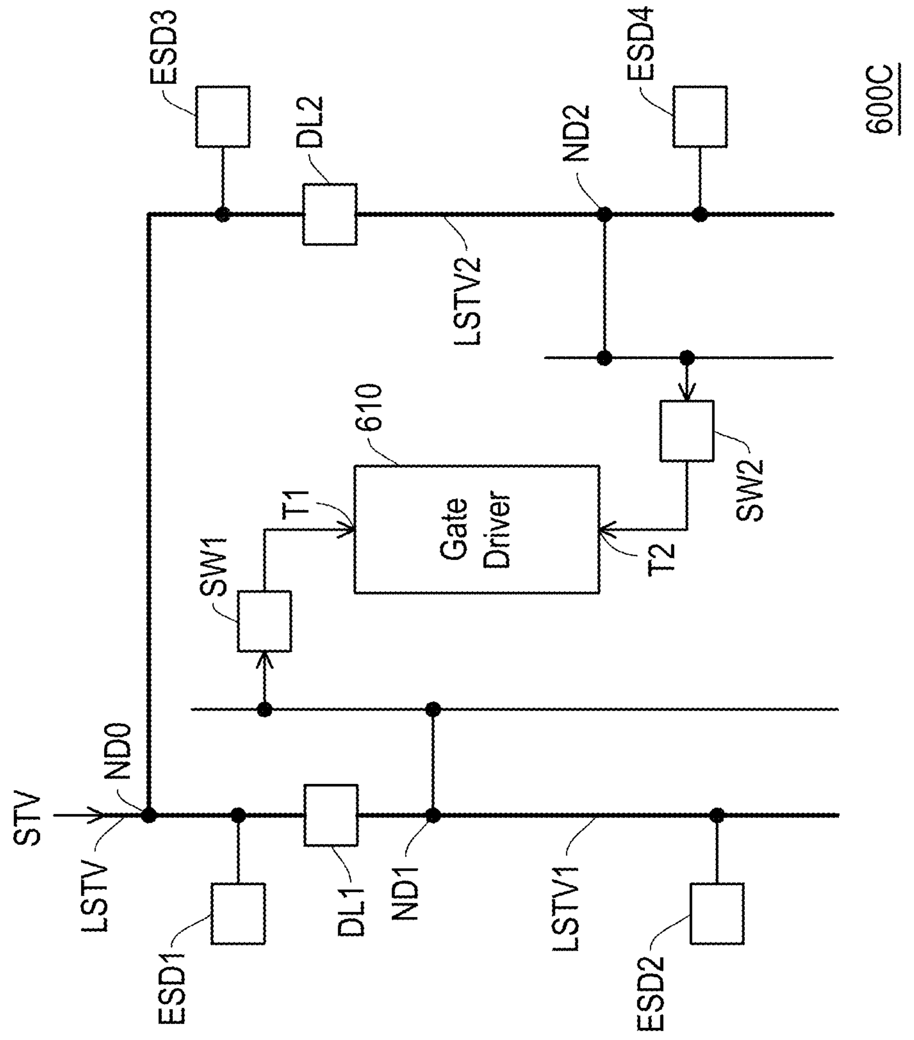
FIG. 8C illustrates a schematic diagram of an electronic device according to an embodiment of the disclosure.

Please refer to FIG. 8C, FIG. 8C illustrates a schematic diagram of an electronic device according to an embodiment of the disclosure. In the embodiment, the electronic device 600C includes a gate driver 610, the signal line LSTV, the switches SW1, SW2 and the delay elements DL1, DL2. The signal line LSTV is branched into lines LSTV1 and LSTV2 on the node ND0. The input terminal of the signal line LSTV receives the start signal STV. The delay element DL1 is connected between the node ND0 and the node ND1 on the line LSTV1. The switch SW1 is connected between the node ND1 and the terminal T1 of the gate driver 610. The delay element DL2 is connected between the node ND0 and the node ND2 on the line LSTV2. The switch SW2 is connected between the node ND2 and the terminal T2 of the gate driver 610.

In the forward scan mode, the switch SW1 is turned on. The switch SW2 is turned off. Therefore, the start signal STV is transferred to the terminal T1 of the gate driver 610 through the switch SW1. In the backward scan mode, the switch SW2 is turned on. The switch SW1 is turned off. Therefore, the start signal STV is transferred to the terminal T2 of the gate driver 610 through the switch SW2.

The delay elements DL1 and DL2 delay the start signal STV based on the same time constant. Therefore, the delay of the start signal STV provided to the terminal T1 is similar to the delay of the start signal STV provided to the terminal T2.

In the embodiment, the electronic device 600C further includes the ESD protection circuit ESD1 to ESD4. The ESD protection circuits ESD1 and ESD2 are connected to the line LSTV1. The ESD protection circuits ESD1 and ESD2 releases an ESD energy on the line LSTV1. The ESD protection circuits ESD3 and ESD4 are connected to the line LSTV2. The ESD protection circuits ESD3 and ESD4 releases an ESD energy on the line LSTV2.

Figure 9:
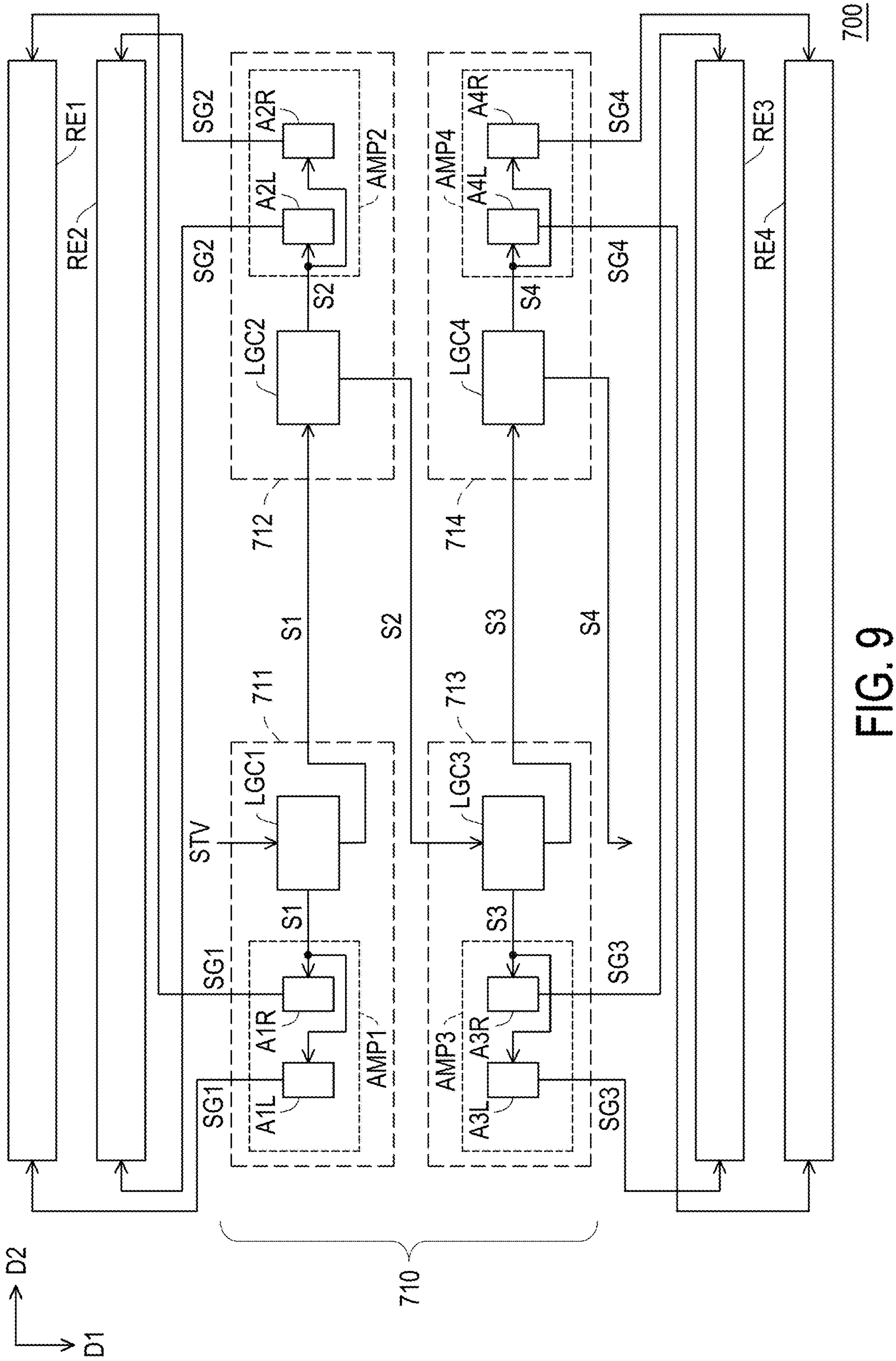
FIG. 9 illustrates a schematic diagram of an electronic device according to an embodiment of the disclosure.

Please refer to FIG. 9, FIG. 9 illustrates a schematic diagram of an electronic device according to an embodiment of the disclosure. In the embodiment, the electronic device 700 includes the electronic unit rows RE1 to RE4 and a gate driver 710. The gate driver 710 and the electronic unit rows RE1 to RE4 are arranged along the column direction D1 and extend along a row direction D2. The gate driver 710 is disposed between two adjacent electronic unit rows RE2 and RE3 of the electronic unit rows RE1 to RE4, but the disclosure is not limited thereto.

In the embodiment, the gate driver 710 includes a first output stage 711, a second output stage 712, a third output stage 713 and a fourth output stage 714. The first output stage 711 includes the first logic circuit LGC1 and the first amplifier AMP1. The first amplifier AMP1 includes sub amplifiers A1L and A1R. In other words, the first amplifier AMP1 is divided into the sub amplifiers A1L and A1R. The sub amplifier A1L outputs the first gate signal SG1 to a first terminal (for example, a left terminal) of the electronic unit row RE1 according to the first signal S1. The sub amplifier A1R outputs the first gate signal SG1 to a second terminal (for example, a right terminal) of the electronic unit row RE1 according to the first signal S1.

The second output stage 712 includes the second logic circuit LGC2 and the second amplifier AMP2. The second amplifier AMP2 includes sub amplifiers A2L and A2R. The sub amplifier A2L outputs the second gate signal SG2 to a first terminal (for example, a left terminal) of the electronic unit row RE2 according to the second signal S2. The sub amplifier A2R outputs the second gate signal SG2 to a second terminal (for example, a right terminal) of the electronic unit row RE2 according to the second signal S2.

The third output stage 713 includes the third logic circuit LGC3 and the third amplifier AMP3. The third amplifier AMP3 includes sub amplifiers A3L and A3R. The sub amplifier A3L outputs the third gate signal SG3 to a first terminal (for example, a left terminal) of the electronic unit row RE3 according to the third signal S3. The sub amplifier A3R outputs the third gate signal SG3 to a second terminal (for example, a right terminal) of the electronic unit row RE3 according to the third signal S3.

The fourth output stage 714 includes the fourth logic circuit LGC4 and the fourth amplifier AMP4. The fourth amplifier AMP4 includes sub amplifiers A4L and A4R. The sub amplifier A4L outputs the fourth gate signal SG4 to a first terminal (for example, a left terminal) of the electronic unit row RE4 according to the fourth signal S4. The sub amplifier A4R outputs the fourth gate signal SG4 to a second terminal (for example, a right terminal) of the electronic unit row RE4 according to the fourth signal S4.

Taking the electronic unit row RE1 and the sub amplifiers A1L and A1R as an example, the sub amplifiers A1L and A1R provide the first gate signal SG1 to the two terminals of the electronic unit row RE1. Furthermore, the first amplifier AMP1 is divided into the sub amplifiers A1L and A1R. Therefore, widths of the sub amplifiers A1L and A1R could be decreased. The sub amplifiers A1L and A1R could be arranged in different pixel column respectively.

Figure 10:
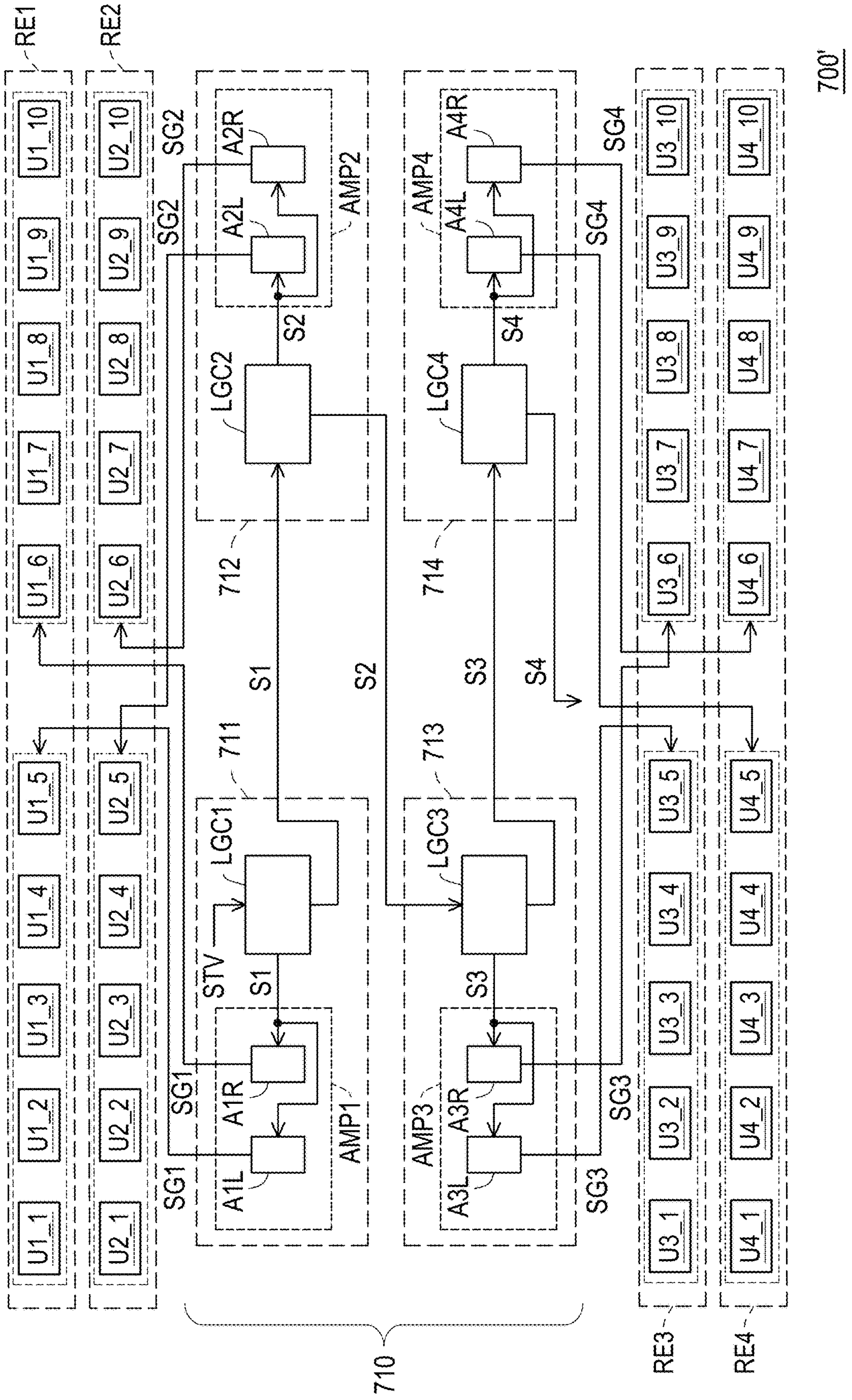
FIG. 10 illustrates a schematic diagram of an electronic device according to an embodiment of the disclosure.

Please refer to FIG. 10, FIG. 10 illustrates a schematic diagram of an electronic device according to an embodiment of the disclosure. In the embodiment, the electronic device 700' includes the electronic unit rows RE1 to RE4 and the gate driver 710. The sub amplifier A1L outputs the first gate signal SG1 to a first electronic unit group of the electronic unit row RE1. The sub amplifier A1R outputs the first gate signal SG1 to a second electronic unit group of the electronic unit row REL. For example, the first electronic unit group of the electronic unit row RE1 includes the electronic units U1_1 to U1_5. The second electronic unit group of the electronic unit row RE1 includes the electronic units U1_6 to U1_10.

The sub amplifier A2L outputs the second gate signal SG2 to a first electronic unit group of the electronic unit row RE2. The sub amplifier A2R outputs the second gate signal SG2 to a second electronic unit group of the electronic unit row RE2. For example, the first electronic unit group of the electronic unit row RE2 includes the electronic units U2_1 to U2_5. The second electronic unit group of the electronic unit row RE2 includes the electronic units U2_6 to U2_10.

The sub amplifier A3L outputs the third gate signal SG3 to a first electronic unit group of the electronic unit row RE3. The sub amplifier A3R outputs the third gate signal SG3 to a second electronic unit group of the electronic unit row RE3. For example, the first electronic unit group of the electronic unit row RE3 includes the electronic units U3_1 to U3_5. The second electronic unit group of the electronic unit row RE3 includes the electronic units U3_6 to U3_10.

The sub amplifier A4L outputs the fourth gate signal SG4 to a first electronic unit group of the electronic unit row RE4. The sub amplifier A4R outputs the fourth gate signal SG4 to a second electronic unit group of the electronic unit row RE4. For example, the first electronic unit group of the electronic unit row RE4 includes the electronic units U4_1 to U4_5. The second electronic unit group of the electronic unit row RE4 includes the electronic units U4_6 to U4_10. Therefore, a parasitic capacitance and a parasitic resistance between the electronic unit row and the amplifier could be decreased. A delay of the gate signal in the electronic unit row could be decreased.

In view of the foregoing, the gate driver is disposed between any two adjacent electronic unit rows of the electronic unit rows. The gate driver and the electronic unit rows are disposed in the active area. In this way, the electronic device is bezeless.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:

a plurality of electronic unit rows; and a gate driver, disposed between any two adjacent electronic unit rows of the plurality of electronic unit rows, wherein the gate driver comprises:

a first output stage, comprising a first logic circuit and a first amplifier, wherein the first amplifier receives a first signal from the first logic circuit and outputs a first gate signal to a first electronic unit row among the plurality of electronic unit rows according to the first signal; and a second output stage, comprising a second logic circuit and a second amplifier, wherein the second amplifier receives a second signal from the second logic circuit and outputs a second gate signal to a second electronic unit row among the plurality of electronic unit rows according to the second signal, wherein the first electronic unit row is adjacent to the second electronic unit row, and the first logic circuit and the second logic circuit are located between the first amplifier and the second amplifier.

2. The electronic device of claim 1, wherein:

the first logic circuit receives a start signal and outputs the first signal according to the start signal, and the second logic circuit receives the first signal and outputs the second signal according to the first signal.

3. The electronic device of claim 1, wherein the gate driver further comprises:

a third output stage, comprising a third logic circuit and a third amplifier, wherein the third amplifier receives a third signal from the third logic circuit and outputs a third gate signal to a third electronic unit row among the plurality of electronic unit rows according to the third signal; and a fourth output stage, comprising a fourth logic circuit and a fourth amplifier, wherein the fourth amplifier receives a fourth signal from the fourth logic circuit and outputs a fourth gate signal to a fourth electronic unit row among the plurality of electronic unit rows according to the fourth signal, wherein the third electronic unit row is adjacent to the fourth electronic unit row, and the third logic circuit and the fourth logic circuit are located between the third amplifier and the fourth amplifier.

4. The electronic device of claim 3, wherein the third logic circuit receives the second signal and outputs the third signal according to the second signal.

5. The electronic device of claim 3, wherein the fourth logic circuit receives the third signal and outputs the fourth signal according to the third signal.

6. The electronic device of claim 3, wherein:

the first output stage and the third output stage are disposed between the second electronic unit row and the third electronic unit row along a column direction, and the second output stage and the fourth output stage are disposed between the second electronic unit row and the third electronic unit row along the column direction.

7. The electronic device of claim 3, wherein:

the first amplifier, the first logic circuit, the second logic circuit and the second amplifier are arranged along a row direction, and the third amplifier, the third logic circuit, the fourth logic circuit and the fourth amplifier are arranged along the row direction.

8. The electronic device of claim 3, wherein:

the first logic circuit comprises a first shift register and a first select circuit, the second logic circuit comprises a second shift register and a second select circuit, and the third logic circuit comprises a third shift register and a third select circuit, the fourth logic circuit comprises a fourth shift register and a fourth select circuit, and in a forward scan mode, the first select circuit controls the first shift register to output the first signal according to a start signal, the second select circuit controls the second shift register to output the second signal according to the first signal, and in the forward scan mode, the third select circuit controls the third shift register to output the third signal according to the second signal, the fourth select circuit controls the fourth shift register to output the fourth signal according to the third signal.

9. The electronic device of claim 8, wherein the first select circuit is located between the first amplifier and the first shift register.

10. The electronic device of claim 8, wherein:

the first shift register has a first circuit portion and a second circuit portion, the third shift register has a third circuit portion and a fourth circuit portion, and the first circuit portion, the third circuit portion, a first electronic unit of the first electronic unit row, a first electronic unit of the second electronic unit row, a first electronic unit of the third electronic unit row and a first electronic unit of the fourth electronic unit row are arranged in a first column.

11. The electronic device of claim 10, wherein the second circuit portion, the fourth circuit portion, a second electronic unit of the first electronic unit row, a second electronic unit of the second electronic unit row, a second electronic unit of the third electronic unit row and a second electronic unit of the fourth electronic unit row are arranged in a second column adjacent to the first column.

12. The electronic device of claim 11, further comprising:

a clock line group, configured to transmit at least one clock; and a data line group, configured to transmit data signals for the first electronic unit row, the second electronic unit row, the third electronic unit row, and the fourth electronic unit row, wherein the clock line group and the data line group are separated by the first column.

13. The electronic device of claim 12, further comprising:

a shift pulse line group, configured to transmit the first signal, the second signal, the third signal and the fourth signal, wherein the shift pulse line group and the data line group are separated by the second column.

14. The electronic device of claim 11, wherein:

the first amplifier has a fifth circuit portion and a sixth circuit portion, the third amplifier has a seventh circuit portion and an eighth circuit portion, and the fifth circuit portion, the seventh circuit portion, a third electronic unit of the first electronic unit row, a third electronic unit of the second electronic unit row, a third electronic unit of the third electronic unit row and a third electronic unit of the fourth electronic unit row are arranged in a third column.

15. The electronic device of claim 14, wherein the sixth circuit portion, the eighth circuit portion, a fourth electronic unit of the first electronic unit row, a fourth electronic unit of the second electronic unit row, a fourth electronic unit of the third electronic unit row and a third electronic unit of the fourth electronic unit row are arranged in a fourth column adjacent to the third column.

16. The electronic device of claim 1, wherein the first amplifier comprises:

a first sub amplifier, configured to output the first gate signal to a first electronic unit group of the first electronic unit row according to the first signal; and a second sub amplifier, configured to output the first gate signal to a second electronic unit group of the first electronic unit row according to the first signal.

17. The electronic device of claim 1, wherein:

the first logic circuit receives a first start signal and outputs the first signal according to the first start signal, and the second logic circuit receives a second start signal and outputs the second signal according to the second start signal.

18. The electronic device of claim 17, wherein the gate driver further comprises:

a third output stage, comprising a third logic circuit and a third amplifier, wherein the third amplifier receives a third signal from the third logic circuit and outputs a third gate signal to a third electronic unit row among the plurality of electronic unit rows according to the third signal; and a fourth output stage, comprising a fourth logic circuit and a fourth amplifier, wherein the fourth amplifier receives a fourth signal from the fourth logic circuit and outputs a fourth gate signal to a fourth electronic unit row among the plurality of electronic unit rows according to the fourth signal, wherein the third electronic unit row is adjacent to the fourth electronic unit row, and the third logic circuit and the fourth logic circuit are located between the third amplifier and the fourth amplifier.

19. The electronic device of claim 18, wherein the third logic circuit receives the first signal and outputs the third signal according to the first signal.

20. The electronic device of claim 18, wherein the fourth logic circuit receives the second signal and outputs the fourth signal according to the second signal.

* * * * *